United States Patent [19]
Koschmieder et al.

[11] 3,802,752
[45] Apr. 9, 1974

[54] ROLLER BEARING

[75] Inventors: Hartmut Koschmieder, Erlangen; Armin Olschewski, Schweinfurt; Hans-Dieter Paschke, Erlangen-Bruck; Wolfgang Pflügner, Herzogenaurach; Ludwig Winkelmann, Erlangen, all of Germany

[73] Assignee: Industriewerk Schaeffler O.H.G., Herzogenaurach, Germany

[22] Filed: May 1, 1972

[21] Appl. No.: 249,407

[30] Foreign Application Priority Data
May 4, 1971  Germany............................ 2121847

[52] U.S. Cl. .............................................. 308/6 C
[51] Int. Cl. ........................................... F16c 29/06
[58] Field of Search............ 308/6 C, 184, 216, 6 R

[56] References Cited
UNITED STATES PATENTS
| | | | |
|---|---|---|---|
| 2,947,581 | 8/1960 | Van Dorn et al.................. | 308/216 |
| 3,608,985 | 9/1971 | Swanson ............................ | 308/6 C |

FOREIGN PATENTS OR APPLICATIONS
| | | | |
|---|---|---|---|
| 1,359,952 | 3/1964 | France.............................. | 308/6 C |
| 1,575,658 | 5/1967 | Germany........................... | 308/6 R |

*Primary Examiner*—Charles J. Myhre
*Assistant Examiner*—Barry Grossman
*Attorney, Agent, or Firm*—Hammond & Littell

[57] ABSTRACT

Novel roller bearings for the longitudinally moveable mounting of parts wherein rollers move into and out of a slot or space between two races arranged parallel to each other.

4 Claims, 4 Drawing Figures

3,802,752

ROLLER BEARING

STATE OF THE ART

Roller bearings of this type are known in a wide variety of designs and have been found to have a broad application as level drives or as roller bearings wherein the rollers rotate in a continuous, closed raceway in which long linear movement routes with the least possible friction are required.

This type of roller bearing which has found particular use for the longitudinally moveable mounting of tool tables for heavy duty machine tools such as grinding machines and the like consist of a housing which has a straight race section under load, a parallel straight return race section and two semi-cylindrical race sections connecting the said races. In such a bearing for mounting a part to be moved with respect to the housing, the rollers run into the support straight race section or run out of it so that Z or Z+1 rollers are within the supporting zone depending upon the division of the rollers. This causes a tool table, for example, mounted longitudinally moveable by the roller bearing to be periodically raised and lowered during the operating movement. The magnitude of the change in height results from the difference of the spring characteristics of Z and Z+1 rollers and will depend upon the load and number of rollers. It causes an undesirable disturbance particularly in precision work such as grinding or polishing.

OBJECTS OF THE INVENTION

It is an object of the invention to provide novel roller bearings for longitudinally moveable mounting of elements with optimum space requirements and load capacity and equal rigidity under high bearing load.

This and other objects and advantages of the invention will become obvious from the following detailed description.

THE INVENTION

The novel roller bearing of the invention for the longitudinally moveable mounting of two elements comprises a plurality of rollers entering and exiting a slot between two parallel races and at least one element supporting one of the races is elastic in the entrance and exit zones of the race. This construction has the advantage that the height differences resulting from the difference of the spring characteristics for Z and Z+1 rollers is about equalized in this elastic zone whereby as constant as possible rigidity is attained and harmful vibrations of the mounted parts is thus largely avoided.

In one embodiment of the invention, the element supporting the race has slots or recesses arranged at a distance from the race and in the entrance and exit zones to provide the elasticity. In one preferred embodiment, the said recesses are at least one slot in the element supporting the race in the entrance and exit zones, the said slots lying in a plane parallel to the race. In another embodiment of the invention, the recesses are longitudinal slots in the said element supporting the race which slots are at right angles to the direction of the race.

Referring now to the drawings.

Figure 1:
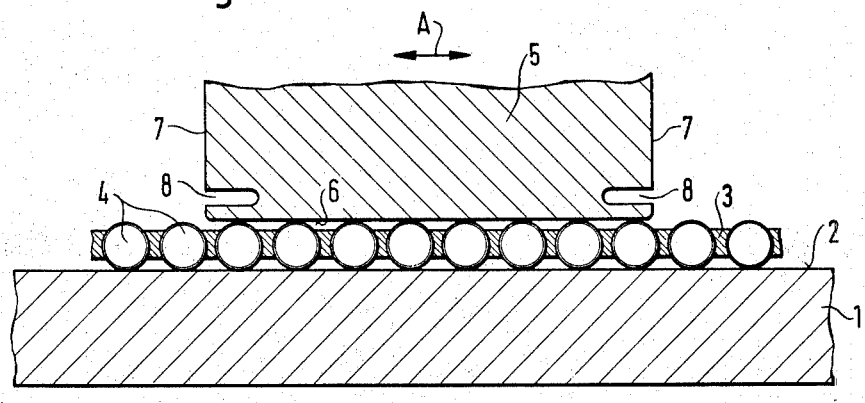
FIG. 1 is a partial cross-sectional view of one embodiment of the roller bearings for longitudinal movement.

In the embodiment, illustrated in FIG. 1, the roller bearing for longitudinal movements is comprised of a base 1 which acts as a straight race 2 for cylindrical rollers 4 held in a flat cage 3 and top element 5 arranged longitudinally moveable above it forms the second race 6 arranged parallel to race 2. The top element 5 is provided on the outer ends 7 at which the rollers 4 run into or out of race 6 in the directions of arrow A upon the sliding movement of element 5 with slots 8 running in a plane parallel to race 6 and spaced a distance therefrom to provide an elastic equalization zone.

Figure 2:
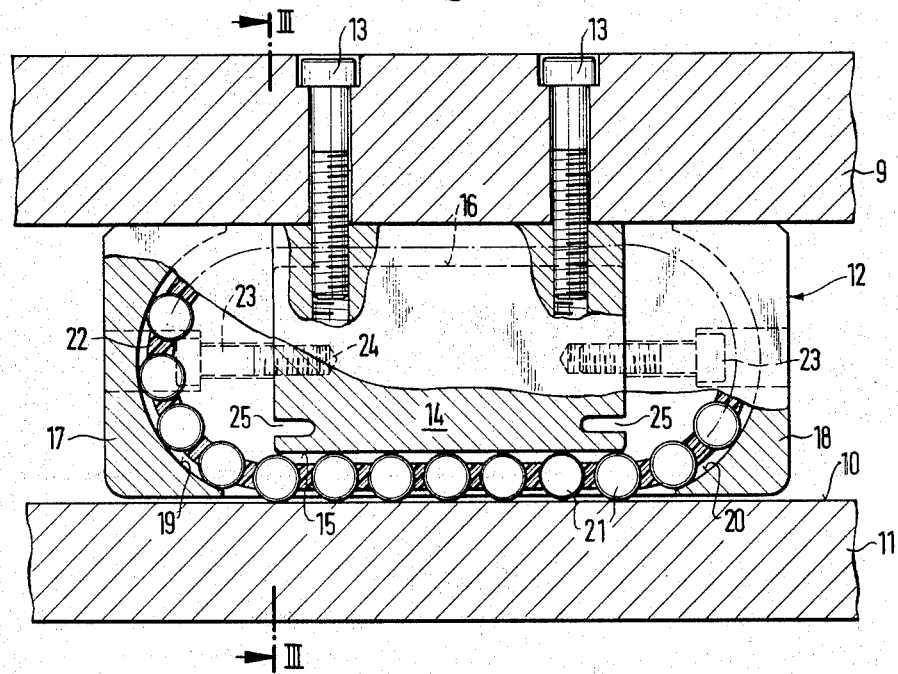
FIG. 2 is a partial cross-sectional view of another roller bearing embodiment of the invention.
Figure 3:
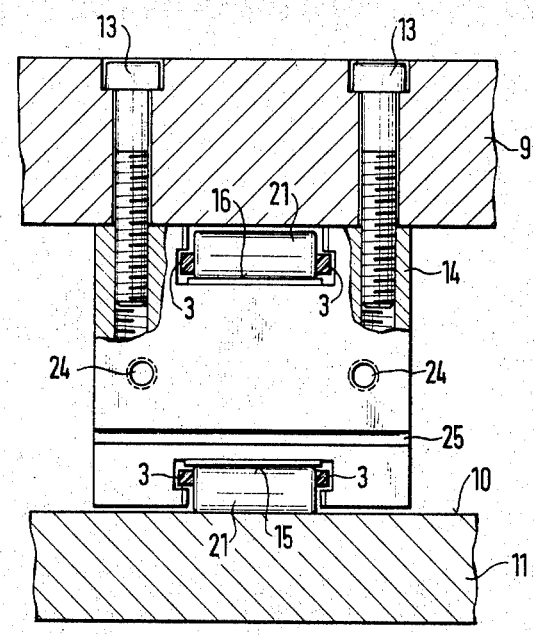
FIG. 3 is a cross-sectional view of the embodiment of FIG. 2 taken along the line III—III.

In the embodiment illustrated in FIGS. 2 and 3, element 9 which may be a moveable tool table is mounted on element 11 such as a base for the machine tool provided with a race 10 by means of roller bearing 12 which may be secured to element 9 by screws 13. The roller bearing is comprised of a housing or body 14 whose lower and upper surfaces form the straight load race 15 and straight return race 16 which is not under load, respectively. The two parallel races 15 and 16 are connected at their ends by lateral parts 17 and 18 which contain semi-cylindrical race sections 19 and 20, respectively. The rollers 21 are secured from dropping out of the bearing by an elastic, such as plastic, cage 22 and lateral parts 17 and 18 are connected to housing 14 by screws 23 engaging tap holes 24 in housing 14. The housing 14 is provided in the entrance and exit zones of the straight race section 15 under load with slots 25 which lie in a plane parallel to race 15.

Figure 4:
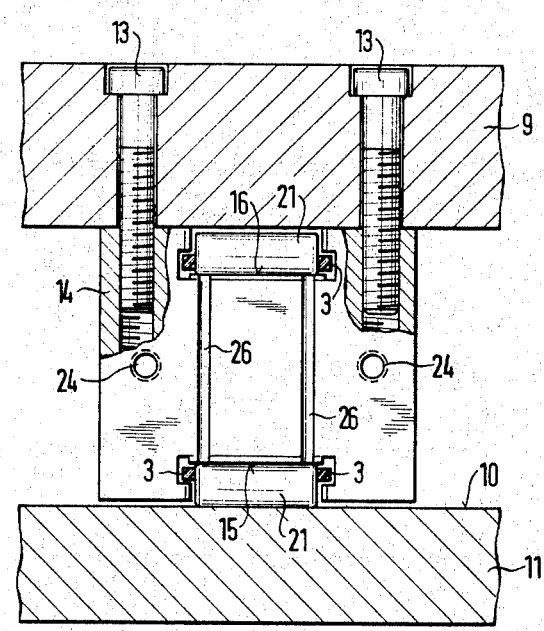
FIG. 4 is another embodiment of a roller bearing in the same view as that of FIG. 3.

In the embodiment of FIG. 4, the roller bearing is similar to that in FIGS. 3 and 4 except that instead of slots 25, the housing 14 is provided with longitudinal slots 26 in the entrance and exit zones which are at right angles to the direction of the race. The elastic zones created by these slot arrangements are constructed so that rollers 4 or 21 coming out of loaded race section 6 or 15, respectively, reach the elastic zone at one end of the race section 6 or 15 as another roller 4 or 21 enters the loaded race section 6 or 15 at the other end.

Various modifications of the invention such as providing other forms of recesses performing the same purposes and that the bearings may be produced by machining or non-cutting operations without departing from the spirit or scope thereof. It is to be understood that the invention is to be limited only as defined in the appended claims.

We claim:

1. A roller bearing for the longitudinally moveable mounting of two elements comprising two longitudionally moveable elements having a space therebetween and a race on each of their confronting surfaces, a plurality of rollers entering and exiting in said space and at least one of said elements being provided in the entrance and exit zones with a recess spaced a distance from the race of the element to provide elastic equalization zones at the entrance and exit zones.

2. A roller bearing of claim 1 wherein the recesses in the element are at least one slot lying in a plane parallel to the race.

3. A roller bearing of claim 1 wherein the recesses in the element are longitudinal slots at right angles to the plane of the said race.

4. A roller bearing of claim 1 wherein the rollers are arranged in an elastic cage.

* * * * *